(12) United States Patent
Daniel

(10) Patent No.: US 9,235,642 B1
(45) Date of Patent: Jan. 12, 2016

(54) SYSTEM AND METHOD FOR CONDUCTING SEARCHES AND DISPLAYING SEARCH RESULTS

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 277 days.

(21) Appl. No.: 13/621,755

(22) Filed: Sep. 17, 2012

Related U.S. Application Data

(60) Provisional application No. 61/535,200, filed on Sep. 15, 2011, provisional application No. 13/589,015, filed on Aug. 17, 2012.

(51) Int. Cl.
*G06F 17/30* (2006.01)

(52) U.S. Cl.
CPC .... *G06F 17/30864* (2013.01); *G06F 17/30554* (2013.01)

(58) Field of Classification Search
None
See application file for complete search history.

(56) References Cited

U.S. PATENT DOCUMENTS

| | | | | |
|---|---|---|---|---|
| 8,271,473 | B2 * | 9/2012 | Berg | 707/708 |
| 2003/0146939 | A1 * | 8/2003 | Petropoulos et al. | 345/810 |
| 2004/0204958 | A1 * | 10/2004 | Perkins et al. | 705/1 |
| 2008/0022229 | A1 * | 1/2008 | Bhumkar et al. | 715/838 |
| 2008/0086688 | A1 * | 4/2008 | Chandratillake et al. | 715/719 |
| 2008/0187125 | A1 | 8/2008 | Siegrist | |
| 2009/0048859 | A1 | 2/2009 | McCarthy et al. | |
| 2010/0042602 | A1 * | 2/2010 | Smyros et al. | 707/4 |
| 2010/0211453 | A1 * | 8/2010 | Huang | 705/14.39 |
| 2012/0109986 | A1 * | 5/2012 | Palermiti, II | 707/754 |

OTHER PUBLICATIONS

Acronym Creator (http://acronymcreator.net) (hereafter ACE) Nov. 13, 2008, U.S. Appl. No. 13/589,015, Office Action dated Feb. 10, 2014.

* cited by examiner

*Primary Examiner* — Sherief Badawi
*Assistant Examiner* — Christopher J Raab
(74) *Attorney, Agent, or Firm* — Carol N. Green Kaul, Esq.

(57) ABSTRACT

The various embodiments of systems described comprising of interfacing with at least one third-party search engine for the at least one third-party search engine to conduct the search using the at least one search query and to retrieve at least one search result from the third-party search engine's search; simultaneously searching the index code database using the at least one search query to retrieve electronically, query hits identifying one or a plurality of companies previously registered with the index code database identifiable as being responsive to the at least one search query; displaying concurrently on a search results page, the search results from the third party search engine's search and the query hits from the index code database search and indexing the search results in paginated format of predetermined length with a predefined number of search results viewable as a preview by a mouseover of at least one page number as displayed on the search results page.

21 Claims, 13 Drawing Sheets

FIG. 3D

GOCOMB    JOBS                                            Advanced Search
                                            Company Search Code Index Find Jobs                Employment Opportunities    ATM 🔍

Job Search               Jobs Available              therightjobforyou

Job Search               Find a Job in Your Area     The Right Job, The Right You Jobs Job Seach                Jobs Jobs (now hiring)           ┌─────────────────────────┐
                                                     │ CALL ME BACK            │
Searches related to jobs                             │ Name        Email       │
                                                     │ John Doe    [        ]  │
                                                     │ ENTER PHONE NUMBER      │
        GOCOOOMB▷                                    │ 123-456-6789            │
        1 2 3 4 5 6 7 8 9 10... Next                 │ 📞 Call Me Back         │
                                                     └─────────────────────────┘

SYSTEM AND METHOD FOR CONDUCTING SEARCHES AND DISPLAYING SEARCH RESULTS

PRIORITY CLAIM

This patent application is a continuation-in-part non-provisional patent application and claims priority to U.S. Provisional Application Ser. No. 61/525,262 titled "System And Method For Conducting Company Searches Using Company Code Index" filed Aug. 19, 2011; U.S. Provisional Patent Application Ser. No. 61/535,200 titled "System And Method For Providing Lead Generation" filed Sep. 15, 2011; and United States Continuation in Part Non-Provisional Application Ser. No. 13/589,015 titled "System And Method For Conducting Company Searches Using Company Code Index" filed Aug. 17, 2012 all of which are hereby incorporated by reference as if fully stated herein.

FIELD OF THE INVENTION

The present disclosure relates generally to electronic systems, apparatuses, and methods, and more particularly, to systems, methods, and various other disclosures related to conducting searches and displaying search results.

BACKGROUND OF THE INVENTION

Many companies advertise on the Internet and pay substantial amounts to optimize searches for their business with the various third-party search engines. Although certain statistical information is reported by the search engines, e.g. numbers of clicks, views, searches, etc., it is well known that the number of hits do not always translate into real business opportunities as there is no comprehensive system or method in place that allows the companies being reviewed to necessarily directly correlate a particular online "inquiry" with the need for feedback or follow-up. Thus, it would be helpful for businesses being reviewed to be able to have their advertisements or information concerning their goods or services displayed in a readily viewable manner that is effective and efficient. The system and methods described herein satisfies these long felt needs in a new and novel manner.

SUMMARY OF THE INVENTION

The various embodiments of systems described herein result from the realization that results from online searches and inquires about companies can be strategically aggregated to report additional information regarding potential buyers', investors' or employees' interests, and/or whether or not a follow up call is required. The system and methods described herein further provide for the registration and listing of companies on a searchable index listing whereby each company is assigned a unique company search code index displayable on at least one third-party search engine for additional review of the company's profile and/or searches. In doing so, an individual, purchaser, investor or potential employee can research the company's profile using the searchable code index and communicate his/her interest in the business through the system and method disclosed herein.

The system and method for conducting searches comprises of at least one server; an index code database in electronic communication with the at least one server; a search index module comprising of computer executable instruction code executable by at least one processor; and the at least one processor comprising of computer executable instruction code executable by the at least one processor and configured to perform any one or more of the following: activate the search index module to receive at least one search query; interface with at least one third-party search engine for the at least one third-party search engine to conduct the search using the at least one search query and to retrieve at least one search result from the third-party search engine's search; simultaneously search the index code database using the at least one search query to retrieve electronically, query hits identifying one or a plurality of companies previously registered with the index code database identifiable as being responsive to the at least one search query; display concurrently on a search results page, the search results from the third party search engine's search and the query hits from the index code database search displayed as an index listing of at least one or more searchable code indexes based on prior registration information obtained from companies previously registered with the index code database; and index the search results in paginated format of predetermined length with a predefined number of search results viewable as a preview by a mouseover of at least one page number as displayed on the search results page.

Search results may include any one or more of the following: documents, news articles, advertisements, or images and the like and are provided for display with any one or more of the following: title, description, and electronic link to the source of the search result. Query hits are provided for display with any one or more of the following: code index, icon, key, preview and electronic link to the source of the index code database, or electronic link to a company directed website.

The system and method further comprises of computer executable instruction code executable by the at least one processor are further operative to receive and aggregate received search results from the third party search engine search, index the search results according to an hierarchical format for paginated display. Hierarchical format is dependent on any one or more of the following: number of hits received for the search query, relevance to the search query, or geographical location. Computer executable instruction code are further operative to access the link to the at least one preview of the predefined number of search results directly from the results page; link to the search result for the at least one preview for display; and display in full the search result for the at least one preview selected.

In some embodiments, system and method comprising of: activating the search index module to receive at least one search query; interfacing with at least one third-party search engine for the at least one third-party search engine to conduct the search using the at least one search query and to retrieve at least one search result from the third-party search engine's search; simultaneously searching the index code database using the at least one search query to retrieve electronically, query hits identifying one or a plurality of companies previously registered with the index code database identifiable as being responsive to the at least one search query; displaying concurrently on a search results page, the search results from the third party search engine's search and the query hits from the index code database search displayed as an index listing of at least one or more searchable code indexes based on prior registration information obtained from companies previously registered with the index code database; and indexing the search results in paginated format of predetermined length with a predefined number of search results viewable as a preview by a mouseover of at least one page number as displayed on the search results page.

System and method further comprises of receiving and aggregating received search results from the third party search engine search, and index the search results according to an hierarchical format for paginated display; displaying the search results; receiving a selection for a display of search results in full from at least one preview as shown on the results page; linking the search result for the at least one preview for display and displaying in full the search result for the at least one preview selected.

Accordingly, the various embodiments and disclosures described herein solve the limitations of the prior art in a new and novel manner.

BRIEF DESCRIPTION OF THE DRAWINGS

FIG. 3A-3F show a system in accordance with one embodiment.

DETAILED DESCRIPTION OF PREFERRED EMBODIMENTS

Figure 1A:
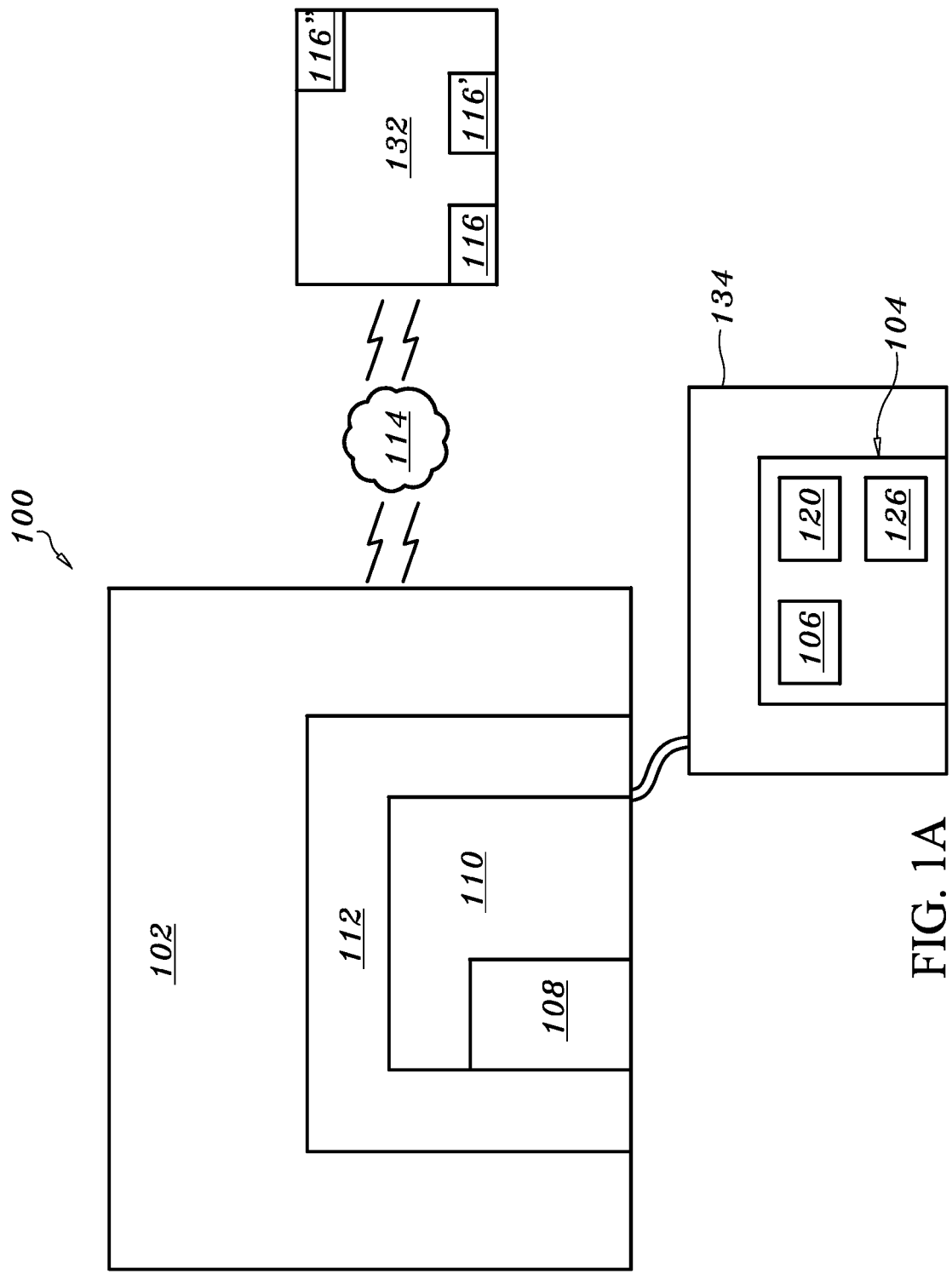
FIG. 1A-1C show a system in accordance with one embodiment.
Figure 1B:
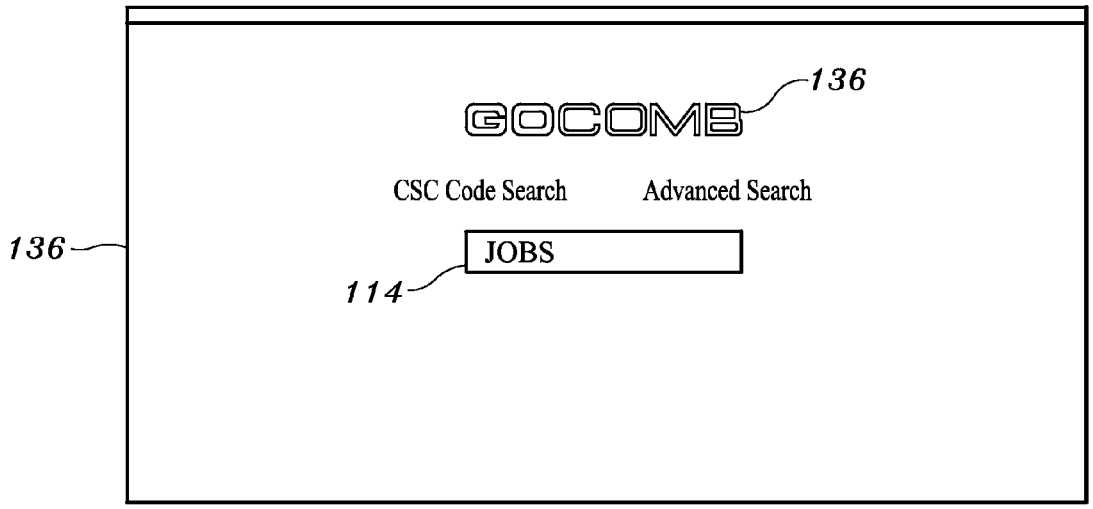
Figure 1C:
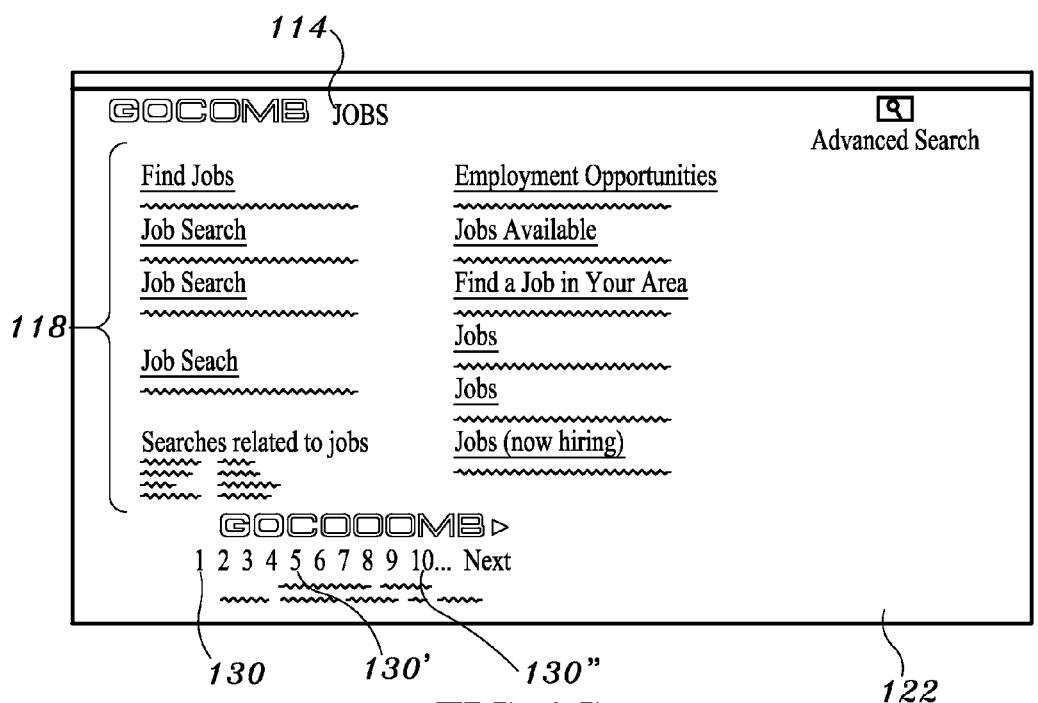

Referring now to FIGS. 1A-1C, a system 100 for conducting searches comprising of: at least one server 102; an electronic index code database 104, in electronic communication with the at least one server 102, that is configured for storing at least one participating company's profile 106 thereon; a search index module 108 comprising of computer executable instruction code 110 executable by at least one processor 112 that is in electronic conmmunication with the at least one server 102; and the at least one processor 112 comprising of computer executable instruction code 110 executable by the at least one processor 112 and configured to perform any one or more of the following: activate the search index module 108 to receive at least one search query 114: interface with at least one or more third-party search engines 116, 116' for the at least one or more third-party search engine 116, 116' to conduct a search using the at least one search query 114 and to retrieve at least one or a plurality of search results 118, 118' from the third-party search engine's search: simultaneously search the index code database 104 using the at least one search query 114 to retrieve electronically, query hits 120 identifying at least one or a plurality of companies previously registered with the index code database 104 identifiable as being responsive to the at least one search query 114; display concurrently on a search results page 122, the search results 118, 118' from the third party search engine's search and the query hits 120, 120' from the index code database 104 search displayed as an index listing 124 of at least one or more searchable code indexes 126, 126' based on prior registration information obtained from companies previously registered with the index code database 104; and index the search results 118, 118' in paginated format of predetermined length with a predefined number of search results 118, 118' viewable as a preview 128 by a mouseover of at least one page number 130 as displayed on the main search results page 122, without having to further click on the page number 130 to be directed to a secondary results page 130 to view the search results 118, 118' in an expanded/full form.

In some embodiments, the computer executable instruction code 110 executable by the at least one processor 112 is operative to perform any one or more of the following: activate the search index module 108 to receive the at least one company's registration information to be displayed as a searchable code index 126 on the index listing 124: convert a name of the at least one company to the searchable code index 126; retrieve at least one company's searchable code index 126 responsive to the search query 114; and retrieve the participating at least one company's profile 106 from the electronic index code database 104 for display as a searchable code index 126. As used herein, "third-party search engine" 116 refers to application programs designed to search information on the world wide web, i.e. the Internet, with displayable results as web pages, images, other information and the like. Exemplary third-party search engines 116, 116' include but are not limited to YAHOO®, BING™, GOOGLE® and the like.

Server 102 may be any kind of server, such as a content management server, a computer sever, a content delivery network server, a DRM server, a search index server, and the like. Server 102 may be a remote server and may be connected to the electronic index code database 104 and/or the at least one processor 112 via a network 132, such as the Internet.

System 100 also includes an electronic index code database 104 as are well known and used in the arts, configured for storing inter alia index listing 124, at least one company's registration information that may include at least one company's profile 106, and searchable code indexes 126, 126' for the registered companies stored thereon. Company's profile 106 may but is not limited to: name, company's URL, address, email, state and year of incorporation, as well as any other pertinent company information such as contact information for the board of directors, description of goods and/or services offered, product rolls outs, product roll out dates and times, market opportunities, job openings, and or any other relevant company information deemed important for public disclosure.

In some embodiments, search index module 108 may comprise of a software aspect, such as a computer program that comprises of computer executable instruction code 110, a hardware aspect, such as an integrated hardware module or discrete hardware module, or a combination of hardware and software aspects. In some embodiments, search index module 108 may be a dongle, including, but not limited to a USB dongle or an HDMI dongle, and may be powered via a USB, HDMI, or external power supply.

Search index module 108 may be a software module or a hardware module and is configured to receive at least one participating company's registration information, wherein the at least one company's name is converted to a unique searchable code index 126 to be displayed on an index listing 124. Search index module 108 also authenticates company's registration information and may be used to communicate relevant information to the server 102 for compiling statistical information for reporting or advertising purposes, registration information for fee collection purposes, pirated content tracking purposes, user experience customization services, collect subscriber information, e.g. subscriber demographics, geographic location, and the like. In some embodiments, search index module 108 may contain a unique subscriber identification module, wherein said module may be a software module or a hardware module, which may be used in the registration authentication process.

System 100 also includes at least one processor 112 in electronic communication with the at least one server 102. Processor 112 may be any type of processor, such as, but not limited to, a central processing unit (CPU), a microprocessor, a video processor, a front end processor, a coprocessor, a single-core processor, a multi-core processor, and the like.

Processor 112 also includes computer executable instruction code 110, where the computer executable instruction code 110 are operative to perform all the necessary functions for the system 100 and methods disclosed herein.

Computer executable instruction code 110 may be loaded directly on the server's processor 112, or its storage means 134. Computer executable instruction code 110 may be any type of computer executable instruction code 110, which may be in the form of a computer program, the program being composed in any suitable programming language or source code, such as C++, C, JAVA, JavaScript, HTML, XML, and other programming languages. Computer executable instruction code 110 is operative to perform any one or more of the following: activate the search index module 108 to receive at least one search query 114; interface with at least one or more third-party search engines 116, 116' for the at least one or more third-party search engine 116, 116' to conduct a search using the at least one search query 114 and to retrieve at least one or a plurality of search results 118, 118' from the third-party search engine's search; simultaneously search the index code database 104 using the at least one search query 114 to retrieve electronically, query hits 120 identifying at least one or a plurality of companies previously registered with the index code database 104 identifiable as being responsive to the at least one search query 114; display concurrently on a search results page 122, the search results 118, 118' from the third party search engine's search and the query hits 120, 120' from the index code database 104 search displayed as an index listing 124 of at least one or more searchable code indexes 126, 126' based on prior registration information obtained from companies previously registered with the index code database 104; and index the search results 118, 118' in paginated format of predetermined length with a predefined number of search results 118, 118' viewable as a preview 128 by a mouseover of at least one page number 130 as displayed on the search results page 122, without having to further click on the page number 130 to be directed to a secondary results page 130 to view the search results 118, 118' in an expanded form.

Storage means 134 may comprise of a storage device and may include memory, such as, but is not limited to, read-only memory, such as CD-ROMs, DVDs, floppy disks, and the like, read and write memory, such as a hard drive, floppy disc, CD-R, CD-RW, DVD-ROM, DVD-R, DVD-RW, solid state memory, such as solid state hard drives, flash memory, and the like, and random access memory. Storage means 134 may be used to store information, such as index code database 104, which may store the index listing 124, company's registration information, company's profile 106, internet protocol addresses, eligibility conditions, search results 118, 118', search results page 122, and the like.

Searchable code index 126 may be an acronym or another shortened form of the registered company's name. In some instances the shortened form or acronym may be unavailable e.g. because a prior registrant may already have been assigned the identical searchable code index 126. In some embodiments, the search code index 126 may be supplied by the company, e.g. at registration. In other embodiments, a computer random generator algorithm executable by the search index module 108 generates unique searchable code indexes 126, 126' for participating companies.

As shown in FIGS. 1B & 1C, in some embodiments the system 100 and method disclosed herein is accessible as an application program 136, accessible via a Uniform Resource Locator ("URL") on the World Wide Web, i.e. the Internet. In some embodiments, the user may download or install the application program 136 toolbar to conduct searches and access search results, 118, 118'.

Once the application program 136 has been activated, and a search query 114 has been entered, e.g. "JOBS," system 100 receives the search query 114 and interfaces with at least one or more third-party search engines 116, 116' for the third-party search engines 116, 116' to conduct a search using the at least one search query 114 and to retrieve at least one or a plurality of search results 118, 118' from the third-party search engine's search. Simultaneously the search index module 108 searches the index code database 104 using the at least one search query 114 (for "JOBS") to electronically retrieve query hits 120 identifying at least one or more companies previously registered with the index code database 104 identifiable as being responsive to the at least one search query 114.

Figure 2:
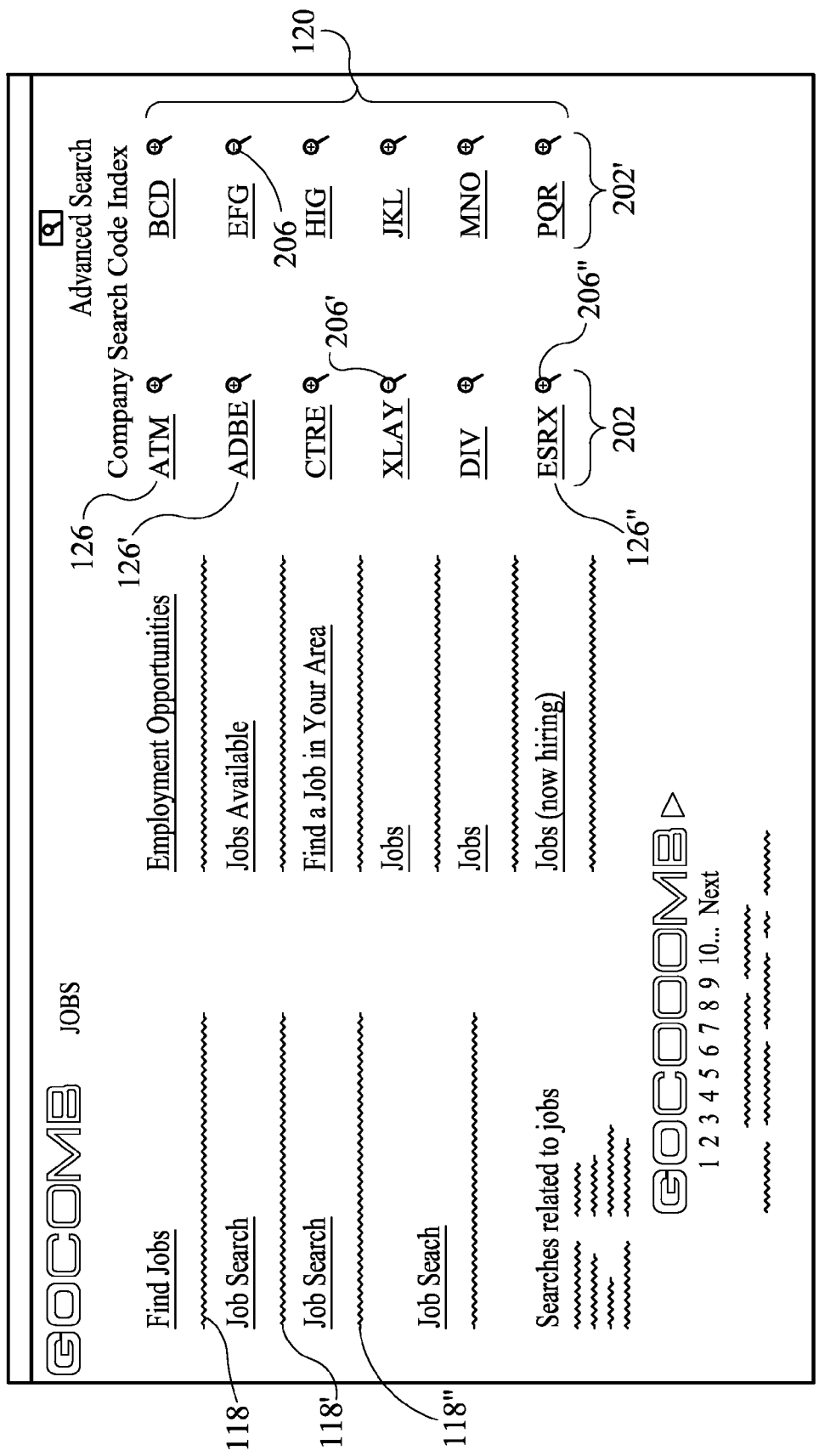
FIG. 2 shows a system in accordance with one embodiment.

Search index module's computer executable instruction code 110 is also configured to display concurrently on a search results page 122, the search results 118, 118' from the third party search engine's search and the query hits 120, 120' from the index code database 104 search displayed as an index listing 124 of at least one or more searchable code indexes 126, 126 based on prior registration information obtained from companies previously registered with the index code database 104; and index the search results 118, 118' in paginated format of predetermined length with a predefined number of search results 118, 118' viewable as a preview 128 by a mouseover of at least one page number 130 as displayed on the search results page 122 as shown in FIG. 2.

It is understood that the index listing 124 is created using all registered company profiles 106, 106' that have qualified for registerability with the system 100 and method. The index listing 124 is displayed simultaneously with the third-party engine's search results 118, 118'. In some embodiments, the index listing 124 is displayed as a plurality of columns 202, 202' to the right or to the left of the third-party engine's search results 118, 118'. In other embodiments, the index listing 124 is displayed as a row 204 (not shown) at the top or bottom of the third-party engine's search results 118, 118'.

As shown in FIG. 2, an exemplary search query 114 for "JOBS" returned third-party engine's search results 118, 118' as displayed. Displayed in conjunction with the third-party engine's search results 118, 118' are columns 202, 202' of the index listing 124, representative of query hits 120 from the index database 104 using the search query 114. The index listing 124 comprises of searchable code indexes 126, 126' of previously registered companies 122, 122', searchable via clickable search icons 126, 126' that are responsive to the search query 114. In some embodiments, the index listing 124 is published in graphics and/or audio.

In this manner, the search results page 122 readily convey search results 118, 118' and query hits 120, 120' in a manner that is convenient for expedient review for the user. On the exemplary search result page 122 shown in FIG. 2, the user can readily deduce that the search results 118, 118' and query hits 120 displayed as code indexes 126, 126' in the index listing 124 have a stronger likelihood of being responsive to the search query 114, i.e. potential job openings for the individual job seeker since only those companies responsive to the search query 114 for "JOBS" in the index code database 104 will be displayed in the index listing 124 that comprises of a finite group Adjacent to the code indexes 126, 126' are clickable search icon 206 designated by a magnifying glass shaped search icon 206 with either a minus or plus sign within. It is understood that the search icon 206 could be in any particular geometric shape or other configuration. In some embodiments, the plus sign within the magnifying glass may indicate a company interest in providing a call back pursuant to a permission based request, while a minus sign may indicate a preference by the registered company that the user go directly to a company directed website without an opportunity for a callback, or vice versa.

The clickable search icon 206 allows an individual to initiate a search and obtain additional search results 118, 118' for the company identified by the code index 126. In some embodiments, no clickable search icon 206 is displayed, but rather a review of the company's profile 106 is available by clicking the searchable code index 116 itself.

In some embodiments, this additional/secondary search is restricted to the electronic database 104 based on the company's registered profile information 106 or other stored registration information, while in other embodiments the additional search also incorporates at least one or more third party searches and results 118. However, by requesting the additional search using the clickable search icon 206, the search is conducted and the results displayed as a preview, summary or in fully expanded form.

Figure 3A:
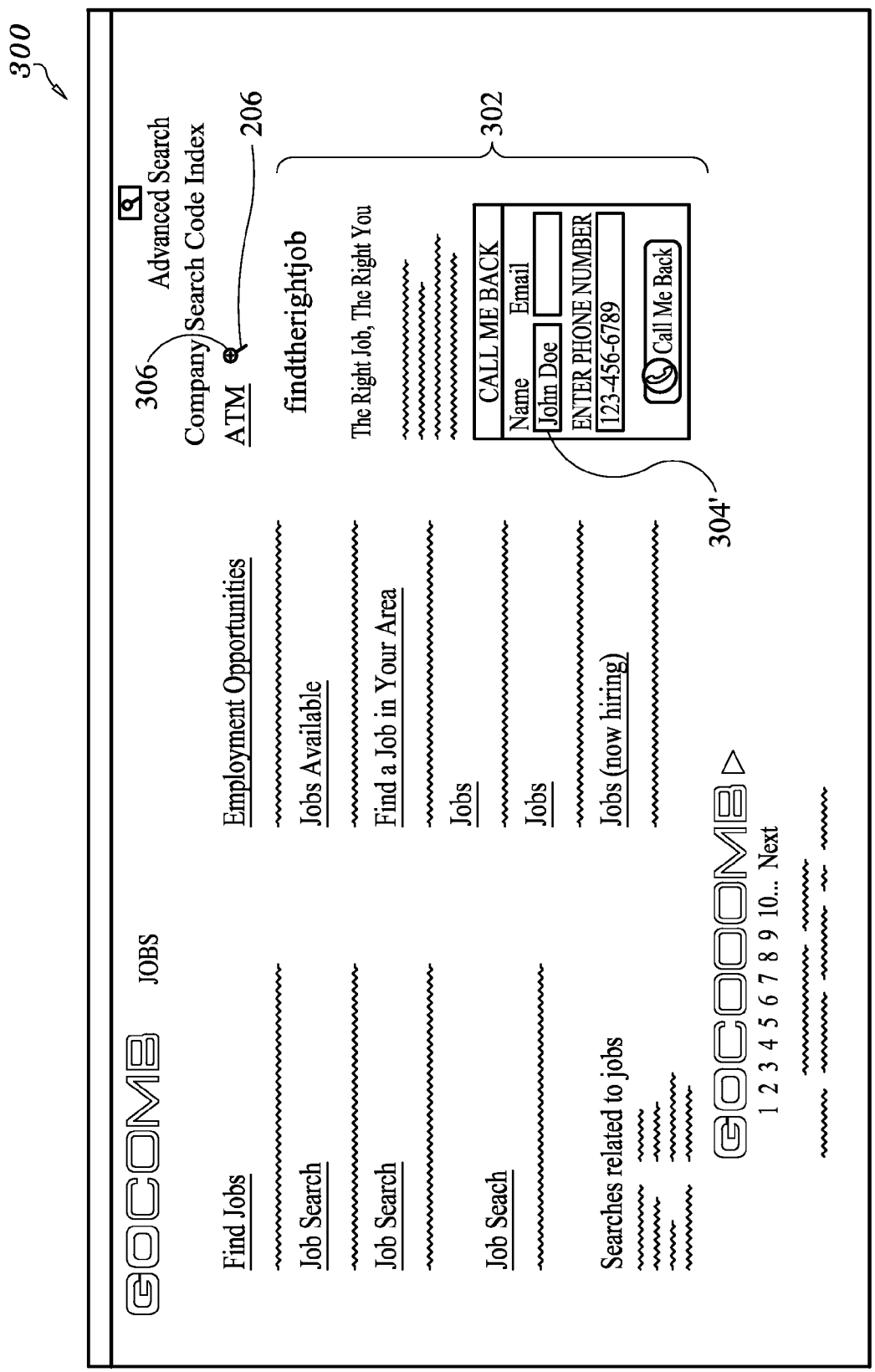
Figure 3B:
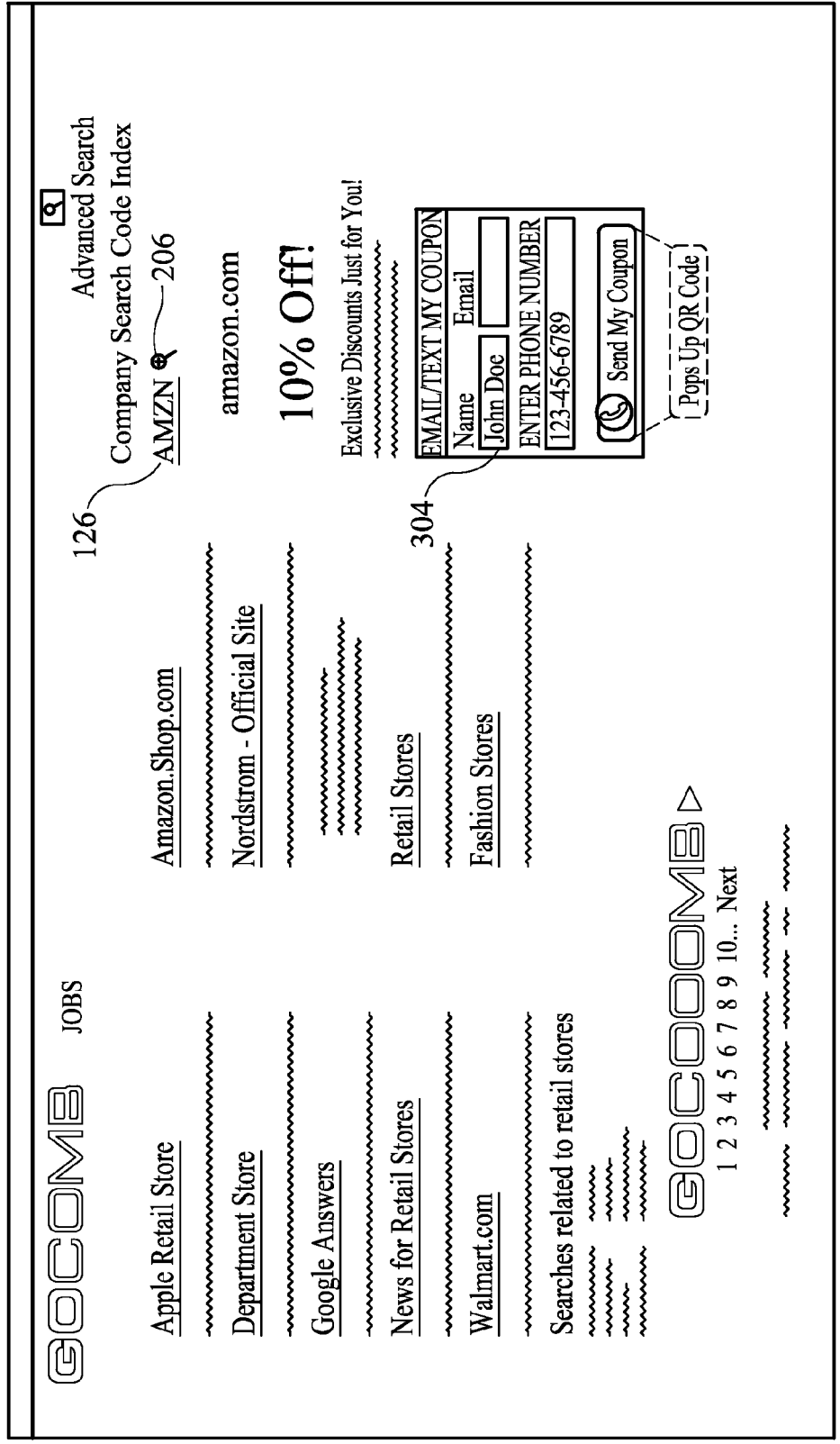
Figure 3C:
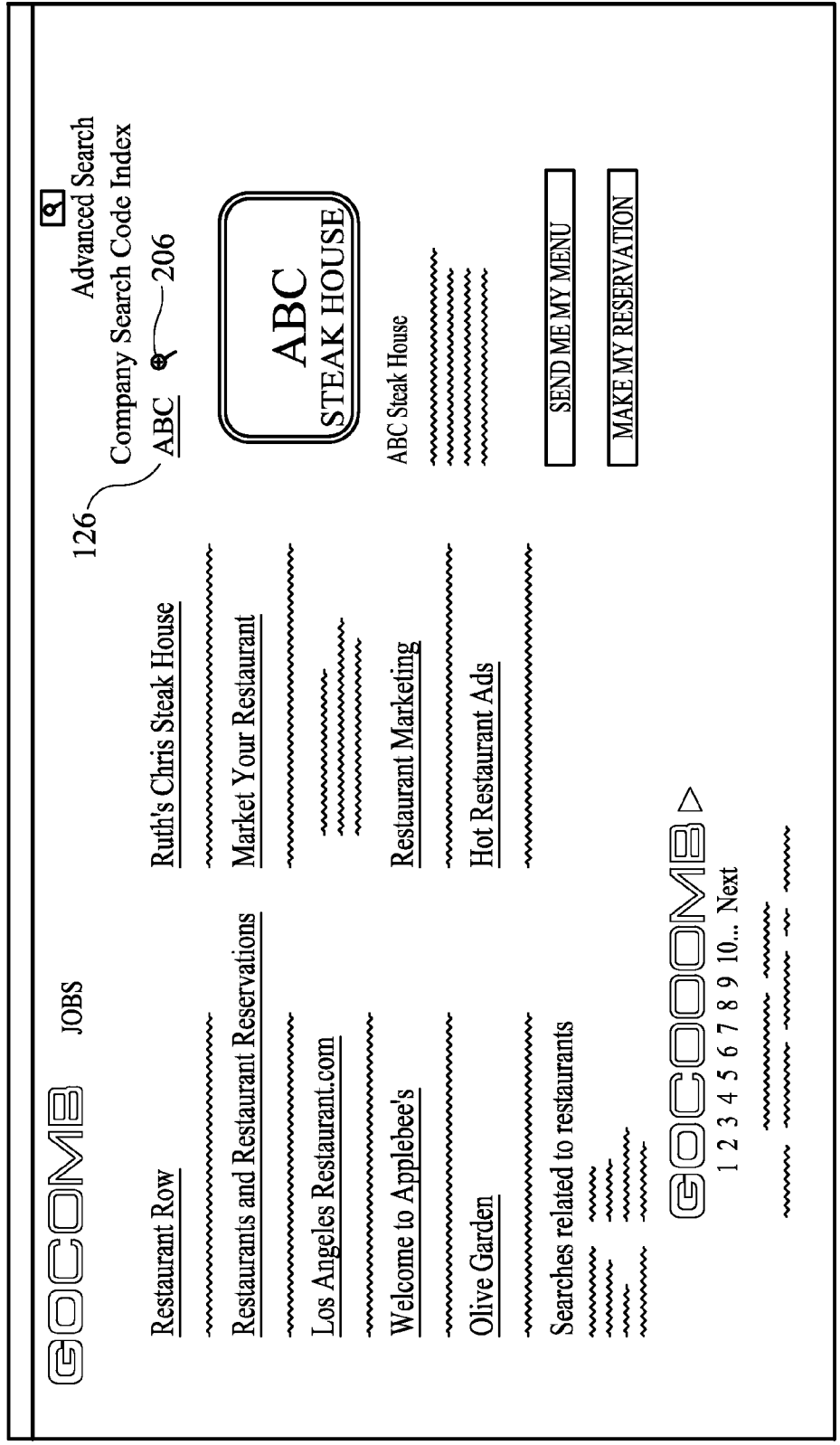
Figure 3D:
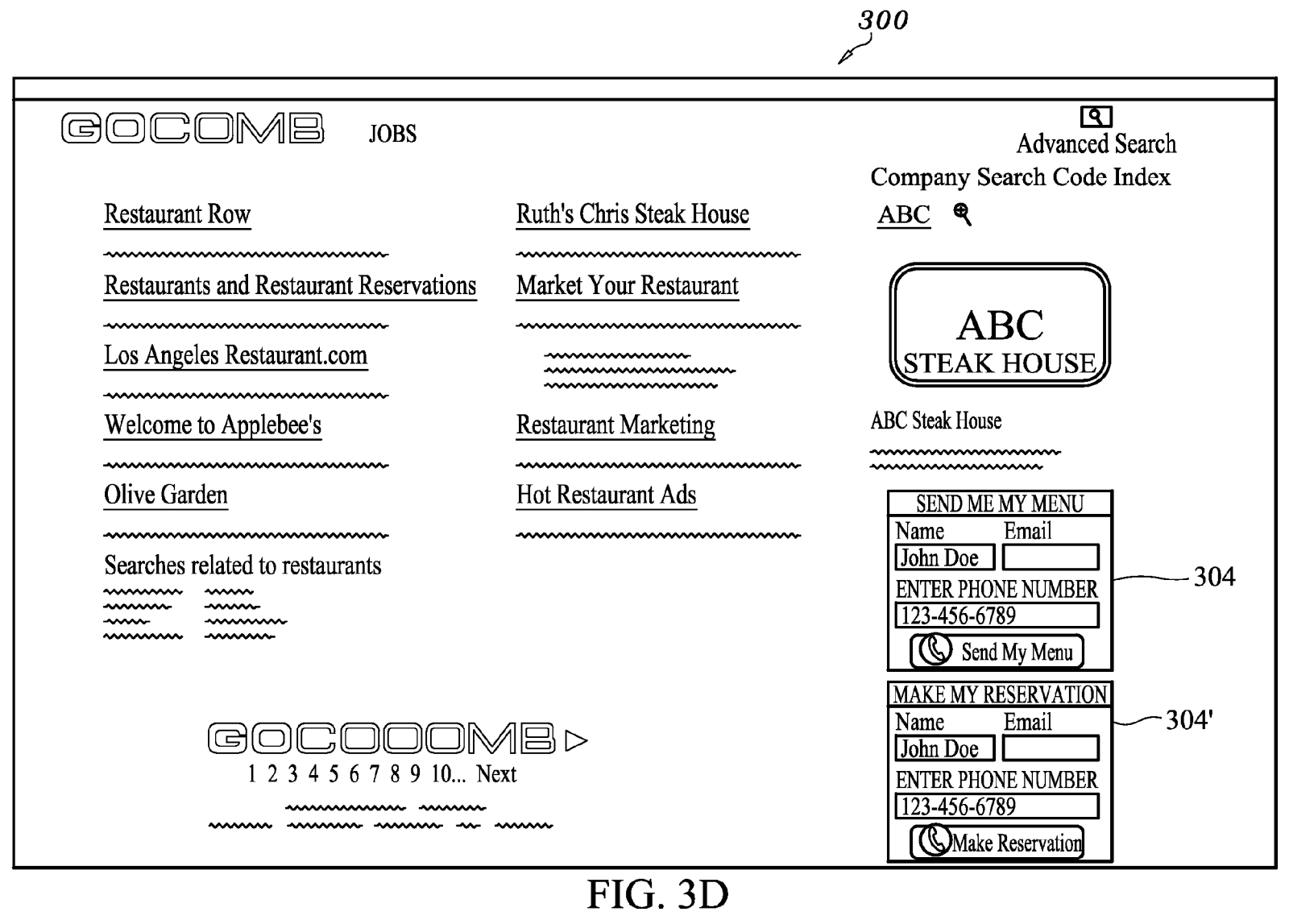
Figure 3F:
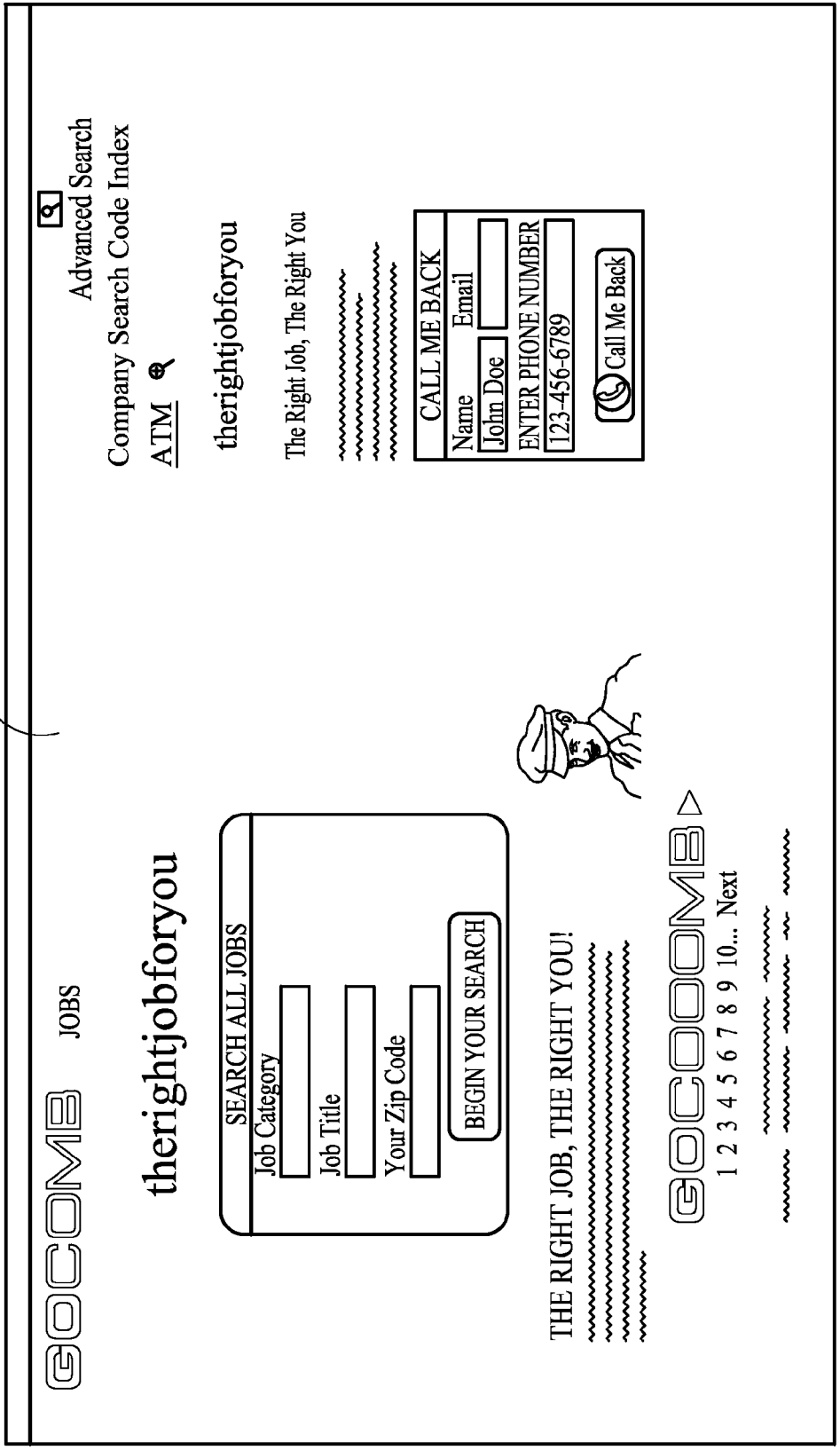

FIGS. 3A-3F show a system 300 in accordance with one embodiment. Search index module 108 includes computer executable instruction code 110 configured to track variables determinative of the type of lead for an electronic lead generation form 302 based on the level of the review and/or identity of verifiable individual contact information 304. Variables being tracked include but are not limited to: the length of time expended in reviewing the company's profile 106 during a review session, number of additional related searches based on keywords within the company's profile 106, number of keystrokes within any given review session to determine whether the search is active or latent because of session time out or computer in sleep mode. As shown in FIG. 3A, in some embodiments, the type of lead is determined solely on verification of the individual's contact information 304, e.g. the President of the United States, or a President of a multi-national corporation, wherein the computer executable instruction code 110 authenticates the individual's contact information 304. In that event, when the "President" requests a follow up call by completing an electronic lead generation form 302, the key 306 is indicative of a hot lead even if the other measured variables indicate a minimal level of review. In some embodiments, the key 306 may include a plus sign to indicate a hot lead, a minus sign to indicate a cold lead and a wavy symbol for warm lead. It is understood that the key 306 may comprise of any visual indicator that is well known and used in the arts.

If an individual, e.g. a potential purchaser, investor, employee or otherwise has an interest in for example a follow up call after reviewing the company's profile 106, the individual may request a callback by completing the online lead generation form 302 as shown in FIG. 3A.

The computer executable instruction code 110 of the search index module 108 and/or the processor 112 are operative to determine the level of review of the at least one company's profile 106; and generate an electronic lead generation form 302 to include a key 306 (not shown) indicative of the type of lead based on the level of review of the company's profile 106 or the individual's contact information 132. The server index module 108 is configured to publish the lead generation form 302 to the corresponding company whose profile 106 was reviewed. Accordingly, companies now have a clearer assessment of the level of interest of the candidates requesting follow up based on the key 306 generated on the lead generation form 302, which readily provides an immediate visual indicator as to the type of lead depending on the level of review of the company's profile 106 and/or verifiable individual contact information 132.

In some embodiments, registered companies may utilize the systems 100, 200, 300 and methods disclosed herein to shown herein to provide target advertisings, coupons, display purchase orders, receive reservations, display menus and the like. In some embodiments, the user may conduct the additional search within the application 136 and the page clicked from the main search results page 122 will be displayed within the application 136 with the option for requesting the vendor to contact the user based on a permission based callback directly through the application 136 as opposed to transferring out to the company's directed website via a link as shown in FIGS. 3A-3F.

Figure 4:
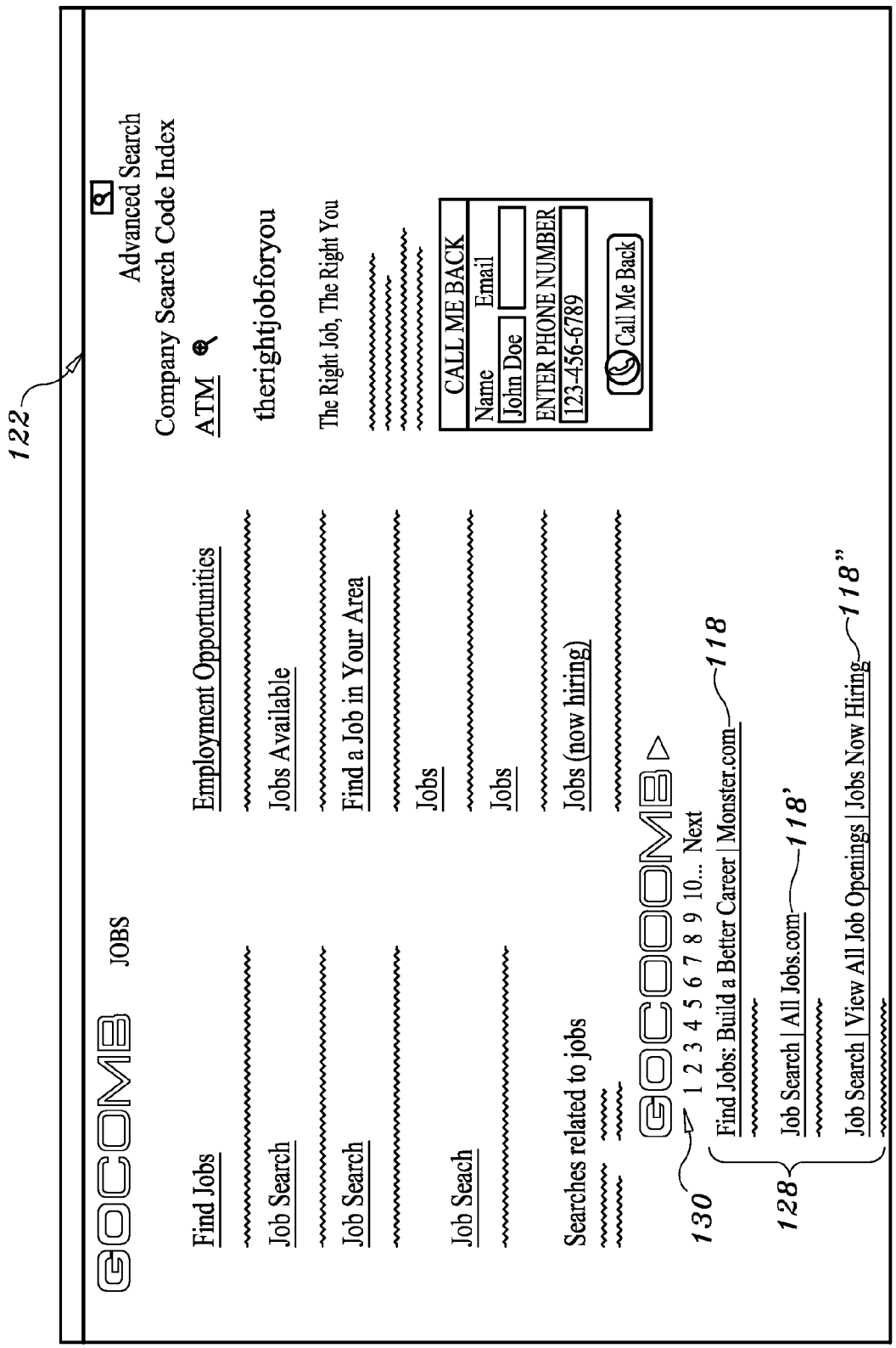
FIG. 4 shows a system in accordance with one embodiment.

FIG. 4 shows a system 400 according to another embodiment. In some embodiments, when the search query 114 returns a plurality of search results 118, 118', the search index module 108 aggregates the results 118, 118' in a hierarchical order from the most responsive to the least responsive results 118, 118' displayed in a paginated format of predetermined length (e.g. 20 search results 118, 118' per page). However, on occasion the most accurate result may not have been flagged as the most responsive and therefore is not displayed on the main search results page 122, but instead in an exemplary embodiment, page "7" of the results 118, 118'. Under the current search engines 116, 116', a user is unable to view the search result 118, 118' on page "7" without leaving the main result page 122. However, in the systems 100-400 and methods described herein, as shown in FIG. 4 on the main results page 122, the search results 118, 118' are displayed in paginated format of predetermined length (e.g. 20 search results 118, 118') with a predefined number of search results 118, 118 being viewable as a preview 128 by a mouseover of at least one page number 130 as displayed on the search results page 122. In the exemplary embodiment, by mousing over page number "7" the preview 128 of predefined number (e.g. 3 results) are viewable. In this manner, users can readily preview the top results for each page without leaving the main results page 122.

Methods

Figure 5:
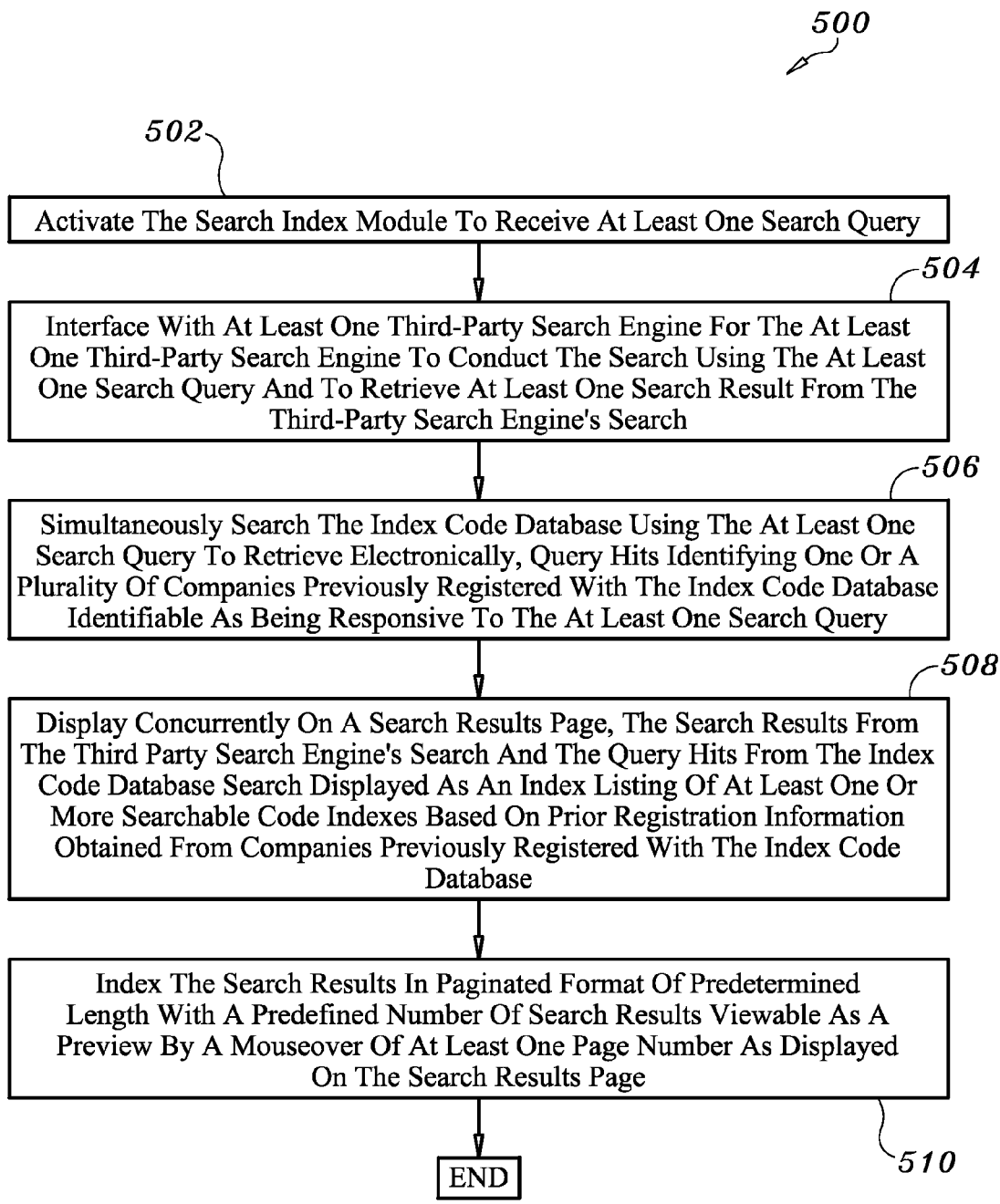
FIG. 5 describes a method according to an embodiment of the invention.

FIG. 5 shows a block diagram depicting a method 500 for conducting searches and displaying search results using the systems 100-400 previously described herein, which are incorporated by reference for all methods as though fully restated herein, comprising of activating the search index module 108 to receive at least one search query 114 (step 502). As previously discussed, search index module 108 may comprise of a software aspect, such as a computer program that comprises of computer executable instruction code 110, a hardware aspect, such as an integrated hardware module or discrete hardware module, or a combination of hardware and software aspects. Search index module's 108 computer executable instruction code 110 is also configured for interfacing with at least one or a plurality of third-party search engines 116, 116', 116" for the at least one third-party search engine 116 to conduct the search using the at least one search query 114 and to retrieve at least one search result 118 from the third-party search engine's search (step 504).

In some embodiments, search index module's 108 computer executable instruction code 110 is configured to simultaneously, search the index code database 104 using the at least one search query 114 to retrieve electronically, query hits 120, 120' identifying one or a plurality of companies previously registered with the index code database 104 identifiable as being responsive to the at least one search query 114 (step 506). Once the query hits 120, 120' are identified, the query hits 120, 120' and the corresponding company search indexes 126, 126' are retrieved from the index code database 104 for display with the search results 118, 118' from the third party search engines 116, 116' where they are augmented if needed for the display.

Method 500 further comprises displaying concurrently on a search results page 122, the search results 118, 118' from the third party search engine's and query hits 120, 120' from the index code database search displayed as an index listing 124 of at least one or more searchable code indexes 126, 126 representative of companies that are responsive to the search query 114 based upon prior registration information obtained from companies previously registered with the index code database 104 (step 508). In this manner, the user has a higher likelihood of success that the query hits 120, 120' are very responsive.

Method 500 further comprises indexing the search results 118, 118' in paginated format of predetermined length with a predefined number of search results 118, 118' viewable as a preview 128 by a mouseover of at least one page number 130 as displayed on the search results page 122 (step 510). Search results 118, 118' may include but is not limited to any one or more of the following: documents, news articles, advertisements, or images and the like and may be provided for display with any one or more of the following: title, description, and electronic link to the source of the search result 118, e.g. a news article or a company's website, etc. Query hits 120, 120' are provided for display with any one or more of the following: code index 126, icon 206, key 306, preview 128 or an electronic link to the source of the index code database 104, or electronic link to a company directed website, which may be their own or a third party's website with information.

In some embodiments, method 500 further comprises of receiving search results 118, 118' from the one or more third party search engine 116, 116' search(es) and aggregating the received search results 118, 118' from the one or more third party search engine 116, 116' search(es) and augmenting for display if needed, e.g. removing or refining the links, enhancing the images displayed, extracting a particular image responsive to the search query 114 and the like. Method 500 further comprises indexing the search results 118, 118' according to an hierarchical format for paginated display, wherein the hierarchical format is dependent on any one or more of the following: number of hits received for the search query 114, relevance to the search query 114, or geographical location and the like. Once the search results 118, 118' have been augmented if necessary and method 500 displays the augmented search for user selection for expanded viewing of the results 118, 118'.

As previously mentioned, In some embodiments the computer executable instruction code 110 executable by the at least one processor 112 are further operative to display a preview 128 of the search results 118, 118' from secondary search results pages 122, 122' by a mouseover of at least one page number 130. As such, a user may preview the search results 118, 118' from a secondary search results page 122 and make a selection directly from the main results page 122 for the full expanded display of the search result 118 listed on a secondary search page 122. Accordingly, method 500 receives the selection from the preview 128 for a search result 118, displayable in full on a secondary (not the main/first) results page 122, to be displayed without leaving the main results page 122. Upon receipt of the selection, method 500 further links to the search result 118, 118' for the at least one preview 128 for display and displays the search result 118, 118' for the at least one preview 128 selected for expanded display of the search result 118, 118'.

Figure 6:
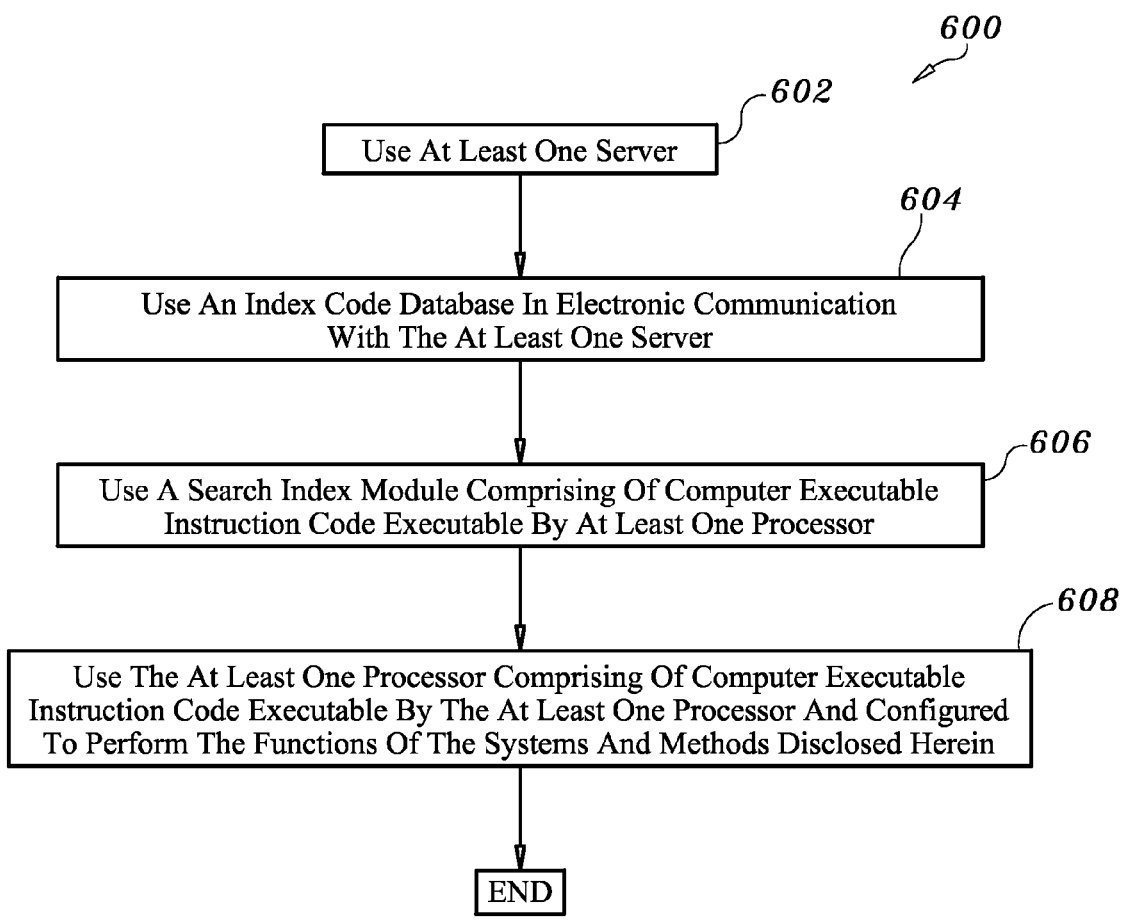
FIG. 6 describes a method according to an embodiment of the invention.

FIG. 6 shows a block diagram depicting a method 600 for conducting searches and displaying search results. Method 600 comprises of using at least one server 102 (step 602); using an index code database 104 in electronic communication with the at least one server 102 (step 604); using a search index module 108 comprising of computer executable instruction code 110 executable by at least one processor 112 (step 606); and using the at least one processor 112 comprising of computer executable instruction code 110 executable by the at least one processor 112 and configured to perform the functions of the systems 100-400 and methods 500-600 disclosed herein, which may include any one or more of the following: activate the search index module 108 to receive at least one search query 114; interface with at least one or more third-party search engines 116, 116' for the at least one or more third-party search engines 116, 116' to conduct the search using the at least one search query 114 and to retrieve at least one search result 118 from the third-party search engines' 116, 116' search; simultaneously search the index code database 104 using the at least one search query 114 to retrieve electronically, query hits 120 identifying one or a plurality of companies previously registered with the index code database identifiable as being responsive to the at least one search query 114; display concurrently on a search results page 122, the search results 118, 118' from the third party search engine's search and the query hits 120 from the index code database 104 search displayed as an index listing 124 of at least one or more searchable code indexes 126, 126' based on prior registration information obtained from companies previously registered with the index code database 104; and index the search results 118, 118 in paginated format of predetermined length with a predefined number of search results 118, 118' viewable as a preview by a mouseover of at least one page number 130 as displayed on the search results page 122.

In some embodiments, the computer executable instruction code executable by the at least one processor is configured to perform any one or more of the following: receive and aggregate received search results 118, 118' from the third party search engine search, and index the search results 118, 118' according to an hierarchical format for paginated display; display the search results 118, 118' in hierarchical format for a paginated display; receive a selection for a display of search results 118, 118' in full from at least one preview 128 as shown on the results page 122; link to the search result 118, 118' for the at least one preview 128 for display; and display in full the search result 118 for the at least one preview 128 selected.

Hardware and Operating Environment

This section provides an overview of example hardware and the operating environments in conjunction with which embodiments of the inventive subject matter can be implemented.

A software program may be launched from a computer readable medium in a computer-based system 700 to execute the functions defined in the software program. Various programming languages may be employed to create software programs designed to implement and perform the method 700 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 7 below.

Figure 7:
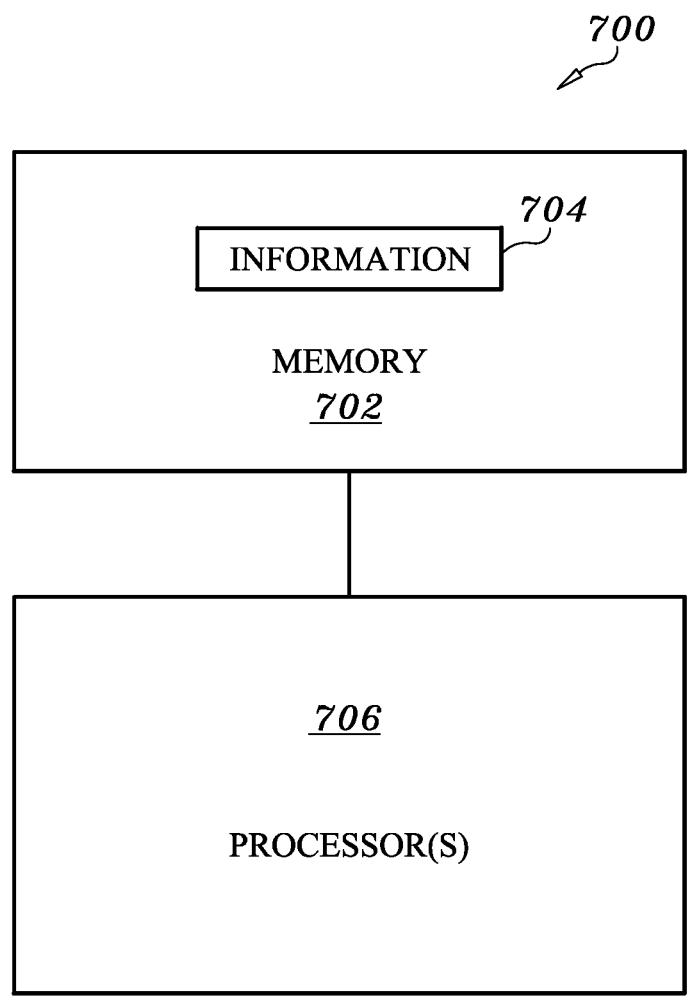
FIG. 7 is a block diagram representing an article according to various embodiments.

FIG. 7 is a block diagram representing an apparatus 700 according to various embodiments. Such embodiments may comprise a computer, a memory system, a magnetic or optical disk, some other storage device, or any type of electronic device or system. The apparatus 700 may include one or more processor(s) 704 coupled to a machine-accessible medium such as a memory 702 (e.g., a memory including electrical, optical, or electromagnetic elements). The medium may contain associated information 706 (e.g., computer program instruction code, data, or both) which, when accessed, results in a machine (e.g., the processor(s) 704) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Accordingly, while the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   at least one server;
   an index code database in electronic communication with the at least one server;
   a search index module comprising of computer executable instruction code executable by at least one processor; and
   the at least one processor comprising of computer executable instruction code executable by the at least one processor and configured to perform any one or more of the following:
      activate the search index module to receive at least one search query;
      interface with at least one third-party search engine for the at least one third-party search engine to conduct the search using the at least one search query and to retrieve at least one search result from the third-party search engine's search;
      simultaneously search the index code database using the at least one search query to retrieve electronically, query hits identifying one or a plurality of companies previously registered with the index code database identifiable as being responsive to the at least one search query;
      display concurrently on a search results page, the search results from the third party search engine's search and the query hits from the index code database search displayed as an index listing of at least one or more searchable code indexes based on prior registration information obtained from companies previously registered with the index code database; and
      index the search results in paginated format of predetermined length with a predefined number of a plurality of search results viewable as a preview by a mouse over of at least one page number and wherein the preview of the plurality of search results for the at least one page number are displayed on the main search results page without having to further click on the page number to be directed to a secondary results page to view the search results.

2. The system of claim 1, wherein the search results include any one or more of the following: documents, news articles, advertisements, or images.

3. The system of claim 1, wherein the search results are provided for display with any one or more of the following: title, description, and electronic link to the source of the search result.

4. The system of claim 1, wherein the query hits are provided for display with any one or more of the following: code index, icon, key, preview and electronic link to the source of the index code database, or electronic link to a company directed website.

5. The system of claim 1, wherein the computer executable instruction code executable by the at least one processor are further operative to receive and aggregate received search results from the third party search engine search, index the search results according to an hierarchical format for paginated display.

6. The system of claim 5, wherein the hierarchical format is dependent on any one or more of the following: number of hits received for the search query, relevance to the search query, or geographical location.

7. The system of claim 1, wherein the computer executable instruction code executable by the at least one processor are further operative to access the link to the at least one preview of the predefined number of search results directly from the results page.

8. The system of claim 1, wherein the computer executable instruction code executable by the at least one processor are further operative to link to the search result for the at least one preview for display.

9. The system of claim 1, wherein the computer executable instruction code executable by the at least one processor are further operative to display in full the search result for the at least one preview selected.

10. A method comprising of:
activating the search index module to receive at least one search query;
interfacing with at least one third-party search engine for the at least one third-party search engine to conduct the search using the at least one search query and to retrieve at least one search result from the third-party search engine's search;
simultaneously searching the index code database using the at least one search query to retrieve electronically, query hits identifying one or a plurality of companies previously registered with the index code database identifiable as being responsive to the at least one search query;
displaying concurrently on a search results page, the search results from the third party search engine's search and the query hits from the index code database search displayed as an index listing of at least one or more searchable code indexes based on prior registration information obtained from companies previously registered with the index code database; and
indexing the search results in paginated format of predetermined length with a predefined number of a plurality of search results viewable as a preview by a mouse over of at least one page number and wherein the preview of the plurality of search results for the at least one page number are displayed on the main search results page without having to further click on the page number to be directed to a secondary results page to view the search results.

11. The method of claim 10, wherein the search results include any one or more of the following: documents, news articles, advertisements, or images.

12. The method of claim 10, wherein the search results are provided for display with any one or more of the following: title, description, and electronic link to the source of the search result.

13. The method of claim 10, wherein the query hits are provided for display with any one or more of the following: code index, icon, key, preview and electronic link to the source of the index code database, or electronic link to the company' website.

14. The method of claim 10, further comprising receive and aggregate received search results from the third party search engine search, and index the search results according to an hierarchical format for paginated display.

15. The method of claim 10, further comprising displaying the search results.

16. The method of claim 14, wherein the hierarchical format is dependent on any one or more of the following: number of hits received for the search query, relevance to the search query, or geographical location.

17. The method of claim 10, further comprising: receiving a selection for a display of search results in full from at least one preview as shown on the results page.

18. The method of claim 10, further comprising linking the search result for the at least one preview for display.

19. The method of claim 10, further comprising displaying in full the search result for the at least one preview selected.

20. A method comprising:
using at least one server;
using an index code database in electronic communication with the at least one server;
using a search index module comprising of computer executable instruction code executable by at least one processor; and
using the at least one processor comprising of computer executable instruction code executable by the at least one processor and configured to perform any one or more of the following:
activate the search index module to receive at least one search query;
interface with at least one third-party search engine for the at least one third-party search engine to conduct the search using the at least one search query and to retrieve at least one search result from the third-party search engine's search;
simultaneously search the index code database using the at least one search query to retrieve electronically, query hits identifying one or a plurality of companies previously registered with the index code database identifiable as being responsive to the at least one search query;
display concurrently on a search results page, the search results from the third party search engine's search and the query hits from the index code database search displayed as an index listing of at least one or more searchable code indexes based on prior registration information obtained from companies previously registered with the index code database; and
index the search results in paginated format of predetermined length with a predefined number of a plurality of search results viewable as a preview by a mouse over of at least one page number and wherein the preview of the plurality of search results for the at least one page number are displayed on the main search results page without having to further click on the page number to be directed to a secondary results page to view the search results.

21. The method of claim 20, wherein the computer executable instruction code executable by the at least one processor is configured to perform any one or more of the following:
receive and aggregate received search results from the third party search engine search, and index the search results according to an hierarchical format for paginated display;
display the search results in hierarchical format for a paginated display;
receive a selection for a display of search results in full from at least one preview as shown on the results page;
link to the search result for the at least one preview for display; and
display in full the search result for the at least one preview selected.

* * * * *